US012811143B2

(12) United States Patent
He et al.

(10) Patent No.: US 12,811,143 B2
(45) Date of Patent: Nov. 24, 2026

(54) ELECTRODE ACTIVE MATERIAL, SECONDARY BATTERY AND POWERED DEVICE

(71) Applicant: CONTEMPORARY AMPEREX TECHNOLOGY (HONG KONG) LIMITED, Hong Kong (CN)

(72) Inventors: Shunli He, Ningde (CN); Zibin Liang, Ningde (CN); Yuhao Wang, Ningde (CN); Wenguang Lin, Ningde (CN); Qiang Li, Ningde (CN); Xinxin Zhang, Ningde (CN); Jinhua He, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 292 days.

(21) Appl. No.: 18/420,795

(22) Filed: Jan. 24, 2024

(65) Prior Publication Data

US 2024/0162438 A1 May 16, 2024

Related U.S. Application Data

(63) Continuation of application No. PCT/CN2022/101163, filed on Jun. 24, 2022.

(51) Int. Cl.
*H01M 4/525* (2010.01)
*C01G 53/51* (2025.01)
(Continued)

(52) U.S. Cl.
CPC ............ *H01M 4/525* (2013.01); *C01G 53/51* (2025.01); *H01M 4/366* (2013.01); *H01M 4/505* (2013.01);
(Continued)

(58) Field of Classification Search
CPC ...... H01M 4/525; H01M 4/366; H01M 4/505; H01M 4/582; H01M 10/052;
(Continued)

(56) References Cited

U.S. PATENT DOCUMENTS

2015/0064580 A1* 3/2015 Bridges ................ H01M 4/366 429/405
2016/0211516 A1* 7/2016 Hu ........................ C01G 53/42
(Continued)

FOREIGN PATENT DOCUMENTS

CN 104795551 A 7/2015
CN 111082059 A 4/2020
(Continued)

OTHER PUBLICATIONS

Xiao et al.: Manipulating Stable Layered P2-Type Cathode via a Co-Substitution Strategy for High Performance Sodium Ion Batteries (Year: 2021).*
(Continued)

*Primary Examiner* — In Suk C Bullock
(74) *Attorney, Agent, or Firm* — K&L Gates LLP

(57) ABSTRACT

An electrode active material is provided. The electrode active material includes a layered metal oxide having a general formula $Na_xZn_aNi_bMn_cM1_dO_2M2_e$, where $0.6 \leq x \leq 0.85$, $0.95 \leq a+b+c+d \leq 1.05$, $0 \leq d \leq 0.05$, and $0 \leq e \leq 0.067$, and where $0.04 \leq a/c \leq 0.1$ and $0.23 \leq b/c \leq 0.45$. M1 is selected from at least one of alkaline earth metal elements, transition metal elements, and alkali metal elements other than Zn, Ni, and Mn, and M2 is selected from non-metallic elements other than O.

20 Claims, 6 Drawing Sheets

(51) Int. Cl.

| | |
|---|---|
| ***H01M 4/36*** | (2006.01) |
| ***H01M 4/505*** | (2010.01) |
| ***H01M 4/58*** | (2010.01) |
| ***H01M 10/052*** | (2010.01) |
| *H01M 4/02* | (2006.01) |

(52) U.S. Cl.
CPC ......... *H01M 4/582* (2013.01); *H01M 10/052* (2013.01); *H01M 2004/028* (2013.01)

(58) Field of Classification Search
CPC .......... H01M 2004/028; C01P 2002/52; C01P 2002/54; C01P 2002/72; C01P 2002/74; C01P 2002/76; C01P 2004/03; C01P 2004/61; C01P 2004/62; C01P 2006/40; Y02E 60/10; C01G 53/50
See application file for complete search history.

(56) References Cited

U.S. PATENT DOCUMENTS

| | | | | |
|---|---|---|---|---|
| 2018/0123164 | A1* | 5/2018 | Han | C01G 49/0072 |
| 2021/0167375 | A1* | 6/2021 | Huang | H01M 4/505 |
| 2021/0344009 | A1* | 11/2021 | Fold Von Bülow | H01M 4/525 |

FOREIGN PATENT DOCUMENTS

| | | | | | |
|---|---|---|---|---|---|
| CN | 111697210 | A | | 9/2020 | |
| CN | 110061229 | B | | 4/2021 | |
| CN | 112670497 | A | | 4/2021 | |
| CN | 112913052 | A | | 6/2021 | |
| CN | 113764669 | A | | 12/2021 | |
| CN | 114613981 | A | | 6/2022 | |
| JP | 2015176678 | A | * | 10/2015 | |
| JP | 2016103463 | A | | 6/2016 | |
| JP | 2016110991 | A | | 6/2016 | |
| WO | WO-2020260294 | A1 | * | 12/2020 | H01M 10/054 |

OTHER PUBLICATIONS

Zhang et al.: Stabilizing P2-Type NiâMn Oxides as High-Voltage Cathodes by a Doping-Integrated Coating Strategy Based on Zinc for Sodium-Ion Batteries (Year: 2021).*

JP_2015176678_A Translation (Year: 2015).*

Li et al. Supporting Information (Year: 2020).*

Li et al. (Year: 2020).*

International Search Report received in the corresponding International Application PCT/CN2022/101163, mailed Mar. 1, 2023.

Written Opinion of ISA received in the corresponding International Application PCT/CN2022/101163, mailed Mar. 1, 2023.

Xia, JY et al. "Enhancing the Interfacial Stability of P2-Type Cathodes by Polydopamine-Derivedcarbon Coating for Achieving Performance Improvement" CARBON, vol. 157 , Nov. 5, 2019 (Nov. 5, 2019), ISSN: 0008-6223,694 Page left column 3rd to 695 right col. 1 section 1, Figure 2.

Li, Wei et al. "Exeploring the Stability Effect of the Co-Substitch P2-NA0.67 [mn0.67ni0.33] O2Cathode for liquid- and Solid-Lon Batteries" ACS Appl. Mater. Interfaces, vol. 12, No. 37, Aug. 19, 2020 (Aug. 19, 2020), ISSN: 1944-8244, p. 41478 Left col. 2 to 41479 Right column 1st, Figure 1.

Wu, Xuehang et al. P2-Type Na0.66ni0.33 One XZNXMN0.67O2 as New High-Voltage Cathode Materials Journal of Power Sources, vol. 281, Dec. 20, 2014 (Dec. 20, 2014), ISSN: 0378-7753, p. 19 Level 3 to 20 p. 1, Figure 1.

The Grant Notice received in the corresponding CN Application No. 202280014484.8 and the allowed claims, dated Nov. 10, 2025, 12 pages with English translation.

The extended European search report received in the corresponding European Application 22940491.8, mailed on Jul. 23, 2024.

Zuo Wenhua et al: "Structure-Performance Relationship of Zn 2+ Substitution in P2—Na 0.66 Ni 0.33 Mn 0.67 0 2 with Different Ni/Mn Ratios for High-Energy Sodium-Ion Batteries", ACS Applied Energy Materials, vol. 2, No. 7, Jun. 5, 2019 (Jun. 5, 2019), pp. 4914-4924, XP093178001.

Kang Wenpei et al: "Tunable Electrochemical Activity of P2—Na 0.6 Mn 0.7 Ni 0.3 0 2-x F x Micro-spheres as High-Rate Cathodes for High-Performance Sodium Ion Batteries", Applied Materials & Interfaces, vol. 13, No. 13, Mar. 26, 2021 (Mar. 26, 2021), pp. 15333-15343, XP093178002.

Office Action (with English Machine Translation), mailed Jul. 28, 2026, for corresponding Chinese Patent Application Serial No. 202511940249.5.

* cited by examiner (a)

(b)

(a)

(b)

ELECTRODE ACTIVE MATERIAL, SECONDARY BATTERY AND POWERED DEVICE

CROSS REFERENCE TO RELATED MATTER

This application is a continuation of international application PCT/CN2022/101163, filed Jun. 24, 2022 and entitled "ELECTRODE ACTIVE MATERIAL, SECONDARY BATTERY AND POWERED DEVICE", the entire content of which is hereby incorporated by reference in its entirety.

TECHNICAL FIELD

The present disclosure relates to the technical field of batteries, in particular to an electrode active material, a secondary battery, and a powered device.

BACKGROUND

In recent years, with the increasing disclosure range of secondary batteries, secondary batteries are widely used in energy storage power systems such as waterpower systems, firepower systems, wind power systems, and solar power stations, as well as fields such as electric tools, electric bicycles, electric motorcycles, electric vehicles, military equipment, and aerospace. As the secondary batteries have been greatly developed, higher requirements are demanded for its energy density, cycle performance, safety performance, etc.

The layered metal oxides are one of the promising positive electrode materials for the sodium-ion batteries due to their simple preparation, high specific capacity, high ionic conductivity, and the like. At present, the structures of these layered metal oxides are mainly divided into P2 type and O3 type in accordance with the occupation mode of the sodium ions among transition metal layers and the accumulation mode of oxygen layers among the transition metal layers. In the P2-type and O3-type transition metal oxides, a single sodium ion respectively occupies positions of a triangular prism (P) and an octahedral (O) among the layers.

A positive electrode material for the sodium-ion batteries with better performance is required in the art.

SUMMARY

In view of the above, the present disclosure provides a novel electrode active material, a secondary battery, and a powered device, which are respectively described below.

In a first aspect, the present disclosure provides an electrode active material including a layered metal oxide having a general formula $Na_xZn_aNi_bMn_cM1_dO_2M2_e$, where $0.6 \leq x \leq 0.85$, $0.95 \leq a+b+c+d \leq 1.05$, $0 \leq d \leq 0.05$, $0 \leq e \leq 0.067x$; $0.04 \leq a/c \leq 0.1$, and $0.23 \leq b/c \leq 0.45$. M1 is selected from at least one of alkaline earth metal elements, transition metal elements, and alkali metal elements other than Zn, Ni, and Mn. M2 is selected from non-metallic elements other than O.

The electrode active material of the above solution has improved phase structure stability. The electrode active material is used for a secondary battery, which exhibits at least one advantage of an increased discharge voltage, an increased specific discharge capacity, or improved cycling performance.

In some embodiments, the electrode active material has at least one of the following characteristics:

(1) $0.03 \leq a \leq 0.075$;

(2) $0.18 \leq b \leq 0.28$;

(3) $0.67 \leq c \leq 0.75$;

(4) $0.03 \leq d \leq 0.05$; or (5) $0 \leq e \leq 0.05$.

In some embodiments, the layered metal oxide belongs to a P2 phase hexagonal crystal system P63/mmc space group.

In some embodiments, the layered metal oxide has a powder XRD diffraction pattern with at least one of the following characteristic peaks:

(1) a first characteristic peak having a 2θ value in a range of 15.75° to 15.90°;

(2) a second characteristic peak having a 2θ value in a range of 31.95° to 32.10°;

(3) a third characteristic peak having a 2θ value in a range of 35.80° to 35.95°;

(4) a fourth characteristic peak having a 2θ value in a range of 36.75° to 36.90°; or (5) a fifth characteristic peak having a 2θ value in a range of 39.40° to 39.55°.

In some embodiments, the layered metal oxide has a powder XRD diffraction pattern characterized by at least one of:

(1) a ratio of a diffraction intensity of the second characteristic peak to a diffraction intensity of the first characteristic peak is in a range of 9.5% to 13.5%;

(2) a ratio of a diffraction intensity of the third characteristic peak to the diffraction intensity of the first characteristic peak is in a range of 10.5% to 14.5%;

(3) a ratio of a diffraction intensity of the fourth characteristic peak to the diffraction intensity of the first characteristic peak is in a range of 0.5% to 1.5%; or (4) a ratio of a diffraction intensity of the fifth characteristic peak to the diffraction intensity of the first characteristic peak is in a range of 16.5% to 21.5%.

In some embodiments, the layered metal oxide has a powder XRD diffraction pattern characterized by at least one of:

(1) the first characteristic peak corresponds to a (002) crystal plane;

(2) the second characteristic peak corresponds to a (004) crystal plane;

(3) the second characteristic peak corresponds to a (004) crystal plane;

(4) the fourth characteristic peak corresponds to a (101) crystal plane; or (5) the fifth characteristic peak corresponds to a (012) crystal plane.

In some embodiments, the layered metal oxide has a powder XRD diffraction pattern further, which includes the following characteristic peaks:

(6) a sixth characteristic peak having a 2θ value in a range of 27.15° to 27.25°; and (7) a seventh characteristic peak having a 2θ value in a range of 28.35° to 28.45°.

In some embodiments, the layered metal oxide has a powder XRD diffraction pattern characterized by at least one of:

(1) a ratio of a diffraction intensity of the sixth characteristic peak to a diffraction intensity of the seventh characteristic peak is 0.3-0.9:1;

(2) a ratio of the diffraction intensity of the sixth characteristic peak to a diffraction intensity of the first characteristic peak is in a range of 0.2% to 1.2%; or (3) a ratio of a diffraction intensity of the seventh characteristic peak to the diffraction intensity of the first characteristic peak is in a range of 0.3% to 1.3%.

In some embodiments, measurement conditions of the powder XRD diffraction pattern of the layered metal oxide are as follows:

(1) a volume average particle size of a powder sample is in a range of 5 μm to 15 μm;
(2) a radiation source is CuK rays;
(3) a scanning mode is step-by-step scanning;
(4) scanning conditions are 0.01° to 0.05°/step; and
(5) an incident slit is in a range of 2 mm to 3 mm, an anti-scatter slit is in a range of 15 mm to 20 mm, and a receiving slit is in a range of 0.2 mm to 0.4 mm.

In some embodiments, the electrode active material has at least one of the following characteristics:

(1) M1 is selected from at least one of alkaline earth metal elements, transition metal elements, and alkali metal elements other than Zn, Ni, and Mn, and M1 belongs to the second period, the third period, the fourth period, or the fifth period; or
(2) M2 is selected from non-metallic elements other than O, and M2 belongs to Period 2, Period 3, or Period 4 of the Periodic Table.

In some embodiments, the electrode active material has at least one of the following characteristics:

(1) M1 is selected from at least one of Li, K, Mg, Fe, Cu, V, Cr, Co, Ti, and Sc; or
(2) M2 is selected from at least one of F, CI, B, C, and N.

In some embodiments, a powder XRD diffraction pattern of the layered metal oxide has an intensity of a characteristic peak of a (002) crystal plane, which satisfies the following relationship:

$$I/I_0 \geq 0.8,$$

where $I_0$ is an intensity of the characteristic peak of the (002) crystal plane of the layered metal oxide without being soaked in water, and I is an intensity of the characteristic peak of the (002) crystal plane of the layered metal oxide after being soaked in water for 24 hours.

In a second aspect, the present disclosure provides a secondary battery including a positive electrode, and the positive electrode includes an electrode active material as described above.

In a third aspect, the present disclosure provides a powered device including the secondary battery described above.

Advantageous Effects

One or more embodiments of the present disclosure have at least one of the following benefits:

(1) the layered metal oxide of the present disclosure has an enhanced phase structure stability and can maintain the phase structure to be stable in aqueous environment and atmospheric environment;
(2) the electrode active material of the present disclosure is used for a secondary battery, and the secondary battery has an increased discharge medium voltage or discharge voltage;
(3) the electrode active material of the present disclosure is used for a secondary battery, and the secondary battery has an improved specific capacity; or
(4) the electrode active material of the present disclosure is used for a secondary battery, which has improved cycle stability.

REFERENCE SIGNS

Figure 1:
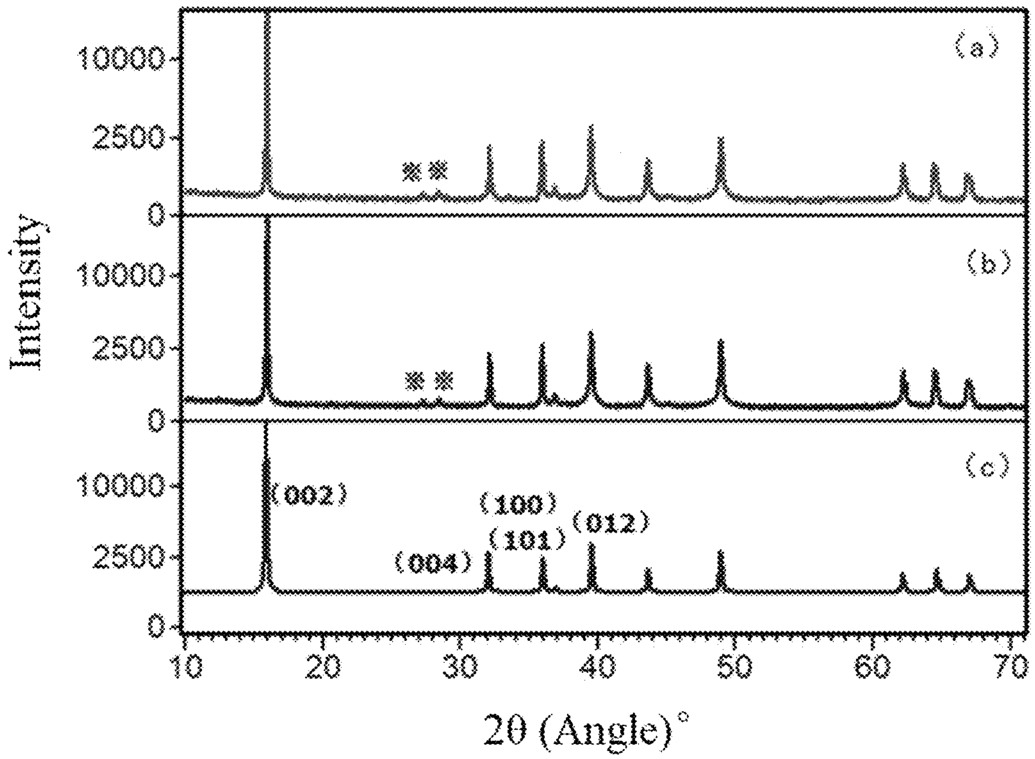
FIG. 1 shows (a), (b), and (c) that respectively illustrate XRD spectrum of a freshly prepared layered metal oxide, a water-washed layered metal oxide, and a standard phase card (00-054-0894) of Embodiment 1.

1. battery pack; 2. Upper box body; 3. Lower box body; 4. Battery module; 5. Secondary battery; 51. casing; 52. Electrode assembly; 53. Top cover assembly.

DESCRIPTION OF EMBODIMENTS

Hereinafter, embodiments of a negative active material and a manufacturing method thereof, a positive electrode plate, a negative electrode plate, a secondary battery, a battery module, a battery pack, and a device of the present application are specifically disclosed with reference to the accompanying drawings. However, there may be cases where unnecessary detailed description is omitted. For example, detailed descriptions of well-known matters and repeated descriptions of practically identical structures are omitted. This is to avoid making the following description unnecessarily lengthy to facilitate understanding for those skilled in the art. In addition, the drawings and the following description are provided to enable those skilled in the art to fully understand the present application and are not intended to limit the subject matter recited in the claims.

The "ranges" disclosed herein are defined in terms of lower and upper limits, a given range is defined by selecting a lower limit and an upper limit, and the selected lower and upper limits defines boundaries of a particular range. Ranges defined in this manner may or may not include end values and may be arbitrarily combined, i.e., any lower limit may be combined with any upper limit to form a range. For example, if ranges of 60 to 120 and 80 to 110 are listed for a particular parameter, it is understood that ranges of 60 to 110 and 80 to 120 are also contemplated. In addition, if listed minimum range values are 1 and 2 and if listed maximum range values are 3, 4, and 5, the following ranges are all conceivable: 1 to 3, 1 to 4, 1 to 5, 2 to 3, 2 to 4, and 2 to 5. In the present application, unless otherwise indicated, the numerical range "a to b" represents an abbreviated representation of any real number combination between a and b, where a and b are both real numbers. For example, a numerical range of "0 to 5" indicates that all real numbers between "0 to 5" have been fully included herein, and "0 to 5" is merely a shorthand representation of combinations of these numbers. In addition, when it is stated that a certain parameter is an integer equal to or greater than 2, it is equivalent to disclosing that the parameter is, e.g., an integer of 2, 3, 4, 5, 6, 7, 8, 9, 10, 11, 12, etc.

All embodiments and alternative embodiments of the present application may be combined with each other to form a new technical solution if not specifically stated.

Unless otherwise specified, all the technical features and optional technical features of the present application may be combined with each other to form a new technical solution.

Unless otherwise specified, all steps of the present application may be performed sequentially or may be performed randomly, preferably sequentially. For example, the process includes steps (a) and (b), meaning that the process may include steps (a) and (b) performed sequentially, or may include steps (b) and (a) performed sequentially. For example, the process may further include step (c), meaning that step (c) may be added to the process in any order, e.g., the process may include steps (a), (b), and (c), include steps (a), (c), and (b), or include steps (c), (a), and (b) or the like.

If not specifically stated, "including" and "incorporating" described herein are intended to be open-ended as well as closed-ended. For example, "including" and "comprising" may mean that other components not listed may be included or incorporated, or that only listed components may be included or incorporated.

In the present application, the term "or" is inclusive if not specifically stated. For example, a phrase "A or B" means "A, B, or both A and B". More specifically, a condition of "A or B" is satisfied by any one of the following conditions: A is true (or present) and B is false (or not present); A is false (or absent) and B is true (or present); or both A and B are true (or present).

[Secondary Battery]

A secondary battery, also referred to as a rechargeable battery or a storage battery, refers to a battery that may be continuously used by activating an active material by charging after the battery is discharged.

Generally, a secondary battery includes a positive electrode plate, a negative electrode plate, a separator, and an electrolytic solution. During charging and discharging of the battery, active ions, such as lithium ions, are intercalated and deintercalated between the positive electrode plate and the negative electrode plate. The separator is arranged between the positive electrode plate and the negative electrode plate, and mainly functions to prevent the positive and negative electrodes from being short-circuited while enabling the active ions to pass therethrough. The electrolytic solution between the positive electrode plate and the negative electrode plate mainly serves to conduct active ions.

The secondary battery is, for example, a sodium-ion battery. The sodium-ion battery mainly includes a positive electrode, a negative electrode, a separator, and an electrolytic solution. The positive and negative electrodes are separated by the separator to prevent short circuit, and the electrolytic solution infiltrates the positive and negative electrodes to ensure ionic conductivity. During charging, $Na^+$ is deintercalated from the positive electrode, passes through the separator via the electrolytic solution, and is intercalated into the negative electrode. In this way, the positive electrode is in a high potential and sodium depleted state, and the negative electrode is in a low potential and sodium enriched state. The discharging process is reversed. That is, during the discharging process, Na+ is deintercalated from the negative electrode, passes through the separator via the electrolytic solution, and is intercalated into the positive electrode material, such that the positive electrode is restored to a sodium-rich state. In order to maintain charge balance, the same number of electrons are transferred through the external circuit during the charging and discharging, and migrate with Na+ between the positive and negative electrodes, such that the positive and negative electrodes undergo oxidation and reduction reactions, respectively. The sodium ions may reversibly migrate in the electrolytic solution between the positive electrode and the negative electrode, both of which are formed of intercalation materials that allow reversible intercalation and deintercalation of the sodium ions.

[Negative Electrode Plate]

The negative electrode plate includes a negative electrode current collector and a negative electrode film layer disposed on at least one surface of the negative electrode current collector. The negative electrode film layer includes a negative electrode active material, and the negative electrode active material uses the negative electrode active material of any one of the present disclosure.

As an example, the negative electrode current collector has two surfaces opposite to each other in a thickness direction thereof, and the negative electrode film layer is disposed on any one or both of the two opposite surfaces of the negative electrode current collector.

In some embodiments, the negative electrode current collector may be a metal foil or a composite current collector. For example, the metal foil is a copper foil. The composite current collector may include a macromolecular material base-layer and a metal layer formed on at least one surface of the macromolecular material base-material. The composite current collector may be formed by forming a metal material (such as, copper, copper alloy, nickel, nickel alloy, titanium, titanium alloy, silver, and silver alloy) on a macromolecular base material (such as, polypropylene (PP), polyethylene terephthalate (PET), polybutylene terephthalate (PBT), polystyrene (PS), and polyethylene (PE)).

In some embodiments, the negative electrode active material may employ a negative electrode active material for a battery known in the art. As an example, the negative electrode active material may include at least one of hard carbon, heteroatom doped carbon, metal oxide, or metal sulfide, which exhibit long cycle life as negative electrode materials for sodium-ion batteries, but their application is limited by their low sodium storage capacity and energy density. The phosphorus-based material includes elemental phosphorus (P), metal phosphides ($M_xP_y$, M=Fe, Co, Ni, Cu, Sn, Mo, etc.) and the like. However, the present disclosure is not limited to these materials, and other conventional materials that may be used as a negative electrode active material for a battery may be used. These negative electrode active materials may be used alone or in combination of two or more.

In some embodiments, the negative electrode film layer further optionally includes a binding agent. The binding agent may be selected from one or more of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from one or more of superconducting carbon, acetylene black, carbon black, Ketjen black, carbon dots, carbon nanotubes, graphene, and carbon nanofibers.

In some embodiments, the negative electrode film layer may optionally include other additives, such as a thickening agent, e.g., sodium carboxymethyl cellulose (CMC-Na).

In some embodiments, the negative electrode plate is prepared as follows. The above components for preparing the negative electrode plate, such as the negative electrode active material, the conductive agent, the binding agent, and any other components, are dispersed in a solvent (for example, deionized water) to form negative electrode slurry. The negative electrode slurry is then coated on the negative electrode current collector, and the negative electrode plate is obtained after drying, cold pressing and other processes.

[Positive Electrode Plate]

In some embodiments, the positive electrode plate generally includes a positive electrode current collector and a positive electrode film layer disposed on at least one surface of the positive electrode current collector, and the positive electrode film layer includes a positive electrode active material.

As an example, the positive electrode current collector has two surfaces opposite to each other in a thickness direction thereof, and the positive electrode film layer is disposed on any one or both of the two opposite surfaces of the positive electrode current collector.

In some embodiments, the positive electrode current collector may be a metal foil or a composite current collector. For example, the metal foil is an aluminum foil. The composite current collector may include a macromolecular material base-layer and a metal layer formed on at least one surface of the macromolecular material base-layer. The composite current collector may be formed by forming a metal material (such as, aluminum, aluminum alloy, nickel, nickel alloy, titanium, titanium alloy, silver, and silver alloy) on a macromolecular base material (such as, polypropylene (PP), polyethylene terephthalate (PET), polybutylene terephthalate (PBT), polystyrene (PS), and polyethylene (PE)).

In some embodiments, the positive electrode film layer further optionally includes a binding agent. As an example, the binding agent may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, or fluorine-containing acrylate resin.

In some embodiments, the positive electrode film layer further optionally includes a conductive agent. As an example, the conductive agent may include at least one of superconducting carbon, acetylene black, carbon black, Ketjen black, carbon dots, carbon nanotubes, graphene, or carbon nanofibers.

In some embodiments, the positive electrode plate is prepared by the conventional ways below. The above components for preparing the positive electrode plate, such as the positive electrode active material, the conductive agent, the binding agent, and any other components, are dispersed in a solvent (e.g., N-methylpyrrolidone) to form positive electrode slurry. The positive electrode slurry is then coated on the positive electrode current collector, and the positive electrode plate is obtained after drying, cold pressing and other processes.

[Positive Electrode Active Material]

In a first aspect, the present disclosure provides an electrode active material including a layered metal oxide, and the layered metal oxide has a general formula:

$$Na_xZn_aNi_bMn_cM1_dO_2M2_e,$$

where $0.6 \leq x \leq 0.85$, $0.95 \leq a+b+c+d \leq 1.05$, $0 \leq d \leq 0.05$, $0 \leq e \leq 0.067x$;

where $0.04 \leq a/c \leq 0.1$, $0.23 \leq b/c \leq 0.45$;

where M1 is selected from at least one of alkali metal elements other than Zn, Ni and Mn, alkaline earth metal elements, and transition metal elements; and where M2 is selected from non-metallic elements other than O.

The electrode active material of the above solution has improved phase structure stability, and is used for a secondary battery. Accordingly, the secondary battery exhibits at least one of an increased discharge voltage, an increased specific discharge capacity, or improved cycling performance. Without being limited by theory, $0.04 \leq a/c \leq 0.1$ and $0.23 \leq b/c \leq 0.45$ are critical for the stability and electrochemical performance of the material. Under the above conditions, Zn element, Ni element and Mn element achieve synergistic effect, which improves the phase structure stability of the material.

In some embodiments, a/c may have a value in a range of 0.04 to 0.06, 0.06 to 0.08, or 0.08 to 0.1. The electrode active material of the above solution has further improved phase structure stability. The electrode active material of the above solution has improved phase structure stability, and is used for a secondary battery, which exhibits at least one advantage of an increased discharge voltage, an increased specific discharge capacity, or improved cycling performance.

In some embodiments, b/c may have a value in a range of 0.23 to 0.25, 0.25 to 0.3, 0.3 to 0.35, 0.35 to 0.4, or 0.4 to 0.45. The electrode active material of the above solution has further improved phase structure stability. The electrode active material of the above solution has improved phase structure stability, and is used for a secondary battery, which exhibits at least one advantage of an increased discharge voltage, an increased specific discharge capacity, or improved cycling performance.

In some embodiments, $0.03 \leq a \leq 0.075$, where a may have a value in a range of 0.03 to 0.04, 0.04 to 0.05, 0.05 to 0.06, 0.06 to 0.07, or 0.07 to 0.075. The electrode active material of the above solution has further improved phase structure stability. The electrode active material of the above solution has improved phase structure stability, and is used for a secondary battery, which exhibits at least one advantage of an increased discharge voltage, an increased specific discharge capacity, or improved cycling performance.

In some embodiments, $0.18 \leq b \leq 0.28$, where b may have a value in a range of 0.18 to 0.2, 0.2 to 0.22, 0.22 to 0.24, 0.24 to 0.26, or 0.26 to 0.28. The electrode active material of the above solution has further improved phase structure stability. The electrode active material of the above solution has improved phase structure stability, and is used for a secondary battery, which exhibits at least one advantage of an increased discharge voltage, an increased specific discharge capacity, or improved cycling performance.

In some embodiments, $0.67 \leq c \leq 0.75$, where c may have a value in a range of 0.67 to 0.69, 0.69 to 0.71, 0.71 to 0.73, or 0.73 to 0.75. The electrode active material of the above solution has further improved phase structure stability. The electrode active material of the above solution has improved phase structure stability, and is used for a secondary battery, which exhibits at least one advantage of an increased discharge voltage, an increased specific discharge capacity, or improved cycling performance.

In some embodiments, $0.03 \leq d \leq 0.05$. The electrode active material of the above solution has further improved phase structure stability. The electrode active material of the above solution has improved phase structure stability, and is used for a secondary battery, which exhibits at least one advantage of an increased discharge voltage, an increased specific discharge capacity, or improved cycling performance.

In some embodiments, d may have a value of 0, 0.01-0.02, 0.02-0.03, 0.03-0.04, or 0.04-0.05. The electrode active material of the above solution has further improved phase structure stability. The electrode active material of the above solution has improved phase structure stability, and is used for a secondary battery, which exhibits at least one advantage of an increased discharge voltage, an increased specific discharge capacity, or improved cycling performance.

In some embodiments, $0 \le e \le 0.05$, where e may have a value of 0, 0.01-0.02, 0.02-0.03, 0.03-0.04, or 0.04-0.05. The electrode active material of the above solution has further improved phase structure stability. The electrode active material of the above solution has improved phase structure stability, and is used for a secondary battery, which exhibits at least one advantage of an increased discharge voltage, an increased specific discharge capacity, or improved cycling performance.

In some embodiments, the layered metal oxide belongs to the P2-phase hexagonal crystal system P63/mmc space group.

In some embodiments, in the layered metal oxide belonging to the P2-phase hexagonal crystal system P63/mmc space group, the transition metal element Me and surrounding six oxygens form a $MeO_6$ octahedral coplanar prism to form transition metal layers, and sodium ions are located between the transition metal layers and occupy prismatic positions between $MeO_6$ interlayers. In the P2 structure, sodium ions occupy two types of prismatic positions between the $MeO_6$ interlayers, one type is a structure that the upper and lower sides of the triangular prism are connected with the transition metal $MeO_6$ octahedron by common edges, and the other type is a structure that the triangular prism is connected with the transition metal $MeO_6$ octahedron in a coplanar manner.

In some embodiments, the layered metal oxide has a powder XRD diffraction pattern with at least one of the following characteristic peaks:

(1) a first characteristic peak having a 2θ value in a range of 15.75° to 15.90°, for example, 15.75° to 15.80°, 15.80° to 15.85°, and 15.85° to 15.90°;

(2) a second characteristic peak having a 2θ value in a range of 31.95° to 32.10°, for example, 31.95° to 32.00°, 32.00° to 32.05°, and 32.05° to 32.10°;

(3) a third characteristic peak having a 2θ value in a range of 35.80° to 35.95°, for example, 35.80° to 35.85°, 35.85° to 35.90°, and 35.90° to 35.95°;

(4) a fourth characteristic peak having a 2θ in a range of 36.75° to 36.90°, for example, 36.75° to 36.80°, 36.80° to 36.85°, and 36.85° to 36.90°; or (5) a fifth characteristic peak having a 2θ in a range of 39.40° to 39.55°, for example, 39.40° to 39.45°, 39.45° to 39.50°, and 39.50° to 39.55°.

In some embodiments, the layered metal oxide has a powder XRD diffraction pattern characterized by one or more of:

(1) a ratio of a diffraction intensity of the second characteristic peak to a diffraction intensity of the first characteristic peak is in a range of 9.5% to 13.5%, for example, 10% to 11%;

(2) a ratio of a diffraction intensity of the third characteristic peak to the diffraction intensity of the first characteristic peak is in a range of 10.5% to 14.5%, for example, 12% to 13%;

(3) a ratio of a diffraction intensity of the fourth characteristic peak to the diffraction intensity of the first characteristic peak is in a range of 0.5% to 1.5%, for example, 0.8% to 1.2%;

(4) a ratio of a diffraction intensity of the fifth characteristic peak to the diffraction intensity of the first characteristic peak is in a range of 16.5% to 21.5%, for example, 17% to 18%.

In some embodiments, the layered metal oxide has a powder XRD diffraction pattern characterized by one or more of:

(1) the first characteristic peak corresponds to a (002) crystal plane;

(2) the second characteristic peak corresponds to a (004) crystal plane;

(3) the third characteristic peak corresponds to a (100) crystal plane;

(4) the fourth characteristic peak corresponds to a (101) crystal plane;

(5) the fifth characteristic peak corresponds to a (012) crystal plane.

In some embodiments, the powder XRD diffraction pattern of the layered metal oxide further has the following characteristic peaks:

(6) a sixth characteristic peak having a 2θ value in a range of 27.15° to 27.25°, for example, 27.15° to 27.20° or 27.20° to 27.25°;

(7) a seventh characteristic peak having a 2θ value in a range of 28.35° to 28.45°, for example, 28.350 to 28.40°, and 28.40° to 28.45°.

The electrode active material of the above solution has further improved phase structure stability. The electrode active material of the above solution has improved phase structure stability, and is used for a secondary battery, which exhibits at least one advantage of an increased discharge voltage, an increased specific discharge capacity, or improved cycling performance.

In some embodiments, the layered metal oxide has a powder XRD diffraction pattern characterized by one or more of:

(1) a ratio of a diffraction intensity of the sixth characteristic peak to a diffraction intensity of the seventh characteristic peak is 0.3-0.9:1;

(2) a ratio of the diffraction intensity of the sixth characteristic peak to the diffraction intensity of the first characteristic peak is in a range of 0.2% to 1.2%, for example, 0.4% to 0.7%;

(3) a ratio of the diffraction intensity of the seventh characteristic peak to the diffraction intensity of the first characteristic peak is in a range of 0.3% to 1.3%, for example, 0.5% to 0.8%.

The electrode active material of the above solution has further improved phase structure stability. The electrode active material of the above solution has improved phase structure stability, and is used for a secondary battery, which exhibits at least one advantage of an increased discharge voltage, an increased specific discharge capacity, or improved cycling performance.

In some embodiments, measurement conditions of the powder XRD diffraction pattern are characterized by one or more of:

(1) a volume average particle size of a powder sample is in a range of 5 μm to 15 μm, for example, 8 μm to 10 μm;

(2) a radiation source includes CuK rays;

(3) a scanning mode is step-by-step scanning;

(4) the scan condition is 0.01-0.05°/step, for example, 0.01-0.02°/step;

(5) an incident slit is in a range of 2 mm to 3 mm, an anti-scatter slit is in a range of 15 mm to 20 mm, and a receiving slit is in a range of 0.2 mm to 0.4 mm.

In some embodiments, a measured range of the powder XRD diffraction pattern of the layered metal oxide is 2θ=10° to 80°.

In some embodiments, distinguishing a characteristic peak from a diffraction background peak is limited by using a calculation method of minimum second derivative, a minimum effective value of 2, a minimum peak top width equal to or greater than 0.01, a maximum peak top width equal to or less than 1, and a peak bottom width of 2.

In some embodiments, the term "average particle size" refers to a volume average particle size Dv50, e.g., a volume average particle size Dv50 measured by a powder laser particle size distribution meter. In the present disclosure, the volume average particle size of the positive electrode active material of the layered oxide is a well-known meaning in the art, and may be measured by using instruments and methods well-known in the art. For example, it may be conveniently determined by laser particle size analyzer with reference to GB/T 19077-2016 particle size distribution laser diffraction method, such as Mastersizer® 2000E laser particle size analyzer manufactured by Marvin Instrument Co., Ltd.

In some embodiments, in the powder XRD diffraction pattern of the layered metal oxide, an intensity of the characteristic peak corresponding to the (002) crystal plane satisfies a relationship of:

$$I/I_0 \geq 0.8,$$

where $I_0$ is an intensity of the characteristic peak of the (002) crystal plane of the layered metal oxide without being soaked in water, and I is an intensity of the characteristic peak of the (002) crystal plane of the layered metal oxide after being soaked in water for 24 hours.

In some embodiments, $0.8 \leq I/I_0 \leq 1$.

In some embodiments, $0.9 \leq I/I_0 \leq 1$.

In the present disclosure, the characteristic peak of the (002) crystal plane of the layered oxide positive electrode active material and the intensity thereof are all well-known meanings in the art. The X-ray diffraction spectrum may be measured by an X-ray powder diffractometer according to JIS K0131-1996 General Principles of X-ray diffraction analysis to obtain the characteristic peak of the (002) crystal plane. A peak height of the characteristic peak of the (002) crystal plane is measured, and is the intensity of the characteristic peak of the (002) crystal plane. For example, a Bruker® D8 Discover X-ray powder diffractometer from Bruker AxS Gmbh is used, CuK α radiation is used as the radiation source, a radiation wavelength λ is 1.5406 Å, and a scanning angle 20 is in a range of 10° to 80°. The X-ray diffraction analysis parameters are as follows. The average particle size of the powder sample is 9 μm, the radiation source is CuK rays, the scan mode is step-by-step scanning, scan conditions are 0.016358°/step, the incident slit is 2.5 mm, the anti-scatter slit is 18 mm, and the receiving slit is 0.30 mm.

In some embodiments, the electrode active material is a powder material. The particle size of the powder is in a range of 0.5 μm to 15 μm, e.g., 0.5 μm to 1 μm, 1 μm 3 μm, 3 μm to 5 μm, 5 μm to 7 μm, 7 μm to 9 μm, 9 μm to 11 μm, 11 μm to 13 μm, or 13 μm to 15 μm.

In a second aspect, the present disclosure provides a secondary battery including a positive electrode, and the positive electrode includes the electrode active material as described above. The secondary battery is, for example, a sodium-ion battery.

In a third aspect, the present disclosure provides a powered device including the secondary battery described above.

[Electrolyte]

The electrolyte functions to conduct ions between the positive electrode plate and the negative electrode plate. The present disclosure has no specific limitation on the type of the electrolyte, which can be selected according to requirements. For example, the electrolyte may be in a liquid state, a gel state, or an all-solid state.

In some embodiments, the electrolyte is electrolytic solution. The electrolytic solution includes electrolyte salt and a solvent.

In some embodiments, the electrolyte salt is selected from sodium perchlorate, sodium hexafluorophosphate, sodium tetrafluoroborate, and sodium hexafluoroarsenate.

In some embodiments, the solvent may be selected from at least one of ethylene carbonate, propylene carbonate, methyl ethyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, tetramethylene sulfone, dimethyl sulfone, methyl ethyl sulfone, and diethyl sulfone.

In some embodiments, the electrolytic solution further optionally includes an additive. As an example, the additive may include a negative electrode film-forming additive and a positive electrode film-forming additive, and may further include additives capable of improving performance of the battery, such as additives for improving overcharge performance of the battery and additives for improving high-temperature or low-temperature performance of the battery.

[Separator]

In some embodiments, the secondary battery further includes an isolation film. The type of the isolation film is not particularly limited in the present disclosure, and may be any well-known isolation film with a porous structure that has good chemical stability and mechanical stability.

In some embodiments, a material of the isolation film may be selected from at least one of glass fiber, non-woven fabric, polyethylene, polypropylene, and polyvinylidene fluoride. The isolation film may be a single-layer film or may be a multilayer composite film, which is not particularly limited. When the isolation film is a multilayer composite film, materials of the layers may be the same or different, which is not particularly limited.

In some embodiments, the positive electrode plate, the negative electrode plate and the isolation film are assembled into an electrode assembly by means of a winding process or a lamination process.

In some embodiments, the secondary battery may include an outer package. The outer package is configured to package the above electrode assembly and the electrolyte.

In some embodiments, the outer package of the secondary battery may be a hard housing, such as a hard plastic housing, an aluminum housing, and a steel housing. The outer package of the secondary battery may be a soft package, such as a bag-type soft package. A material of the soft package may be plastic, such as polypropylene, polybutylene terephthalate, and polybutylene succinate.

Figure 5:
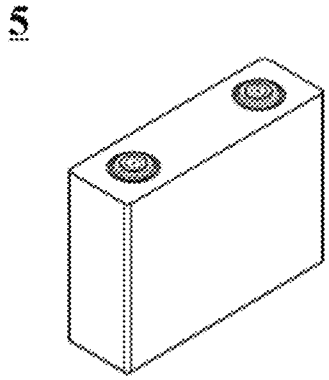
FIG. 5 is a schematic diagram of a secondary battery according to an embodiment of the present disclosure.

The shape of the secondary battery is not particularly limited in the present disclosure, and may be cylindrical, square, or any other shape. For example, FIG. 5 illustrates a secondary battery 5 having a square structure as an example.

Figure 6:
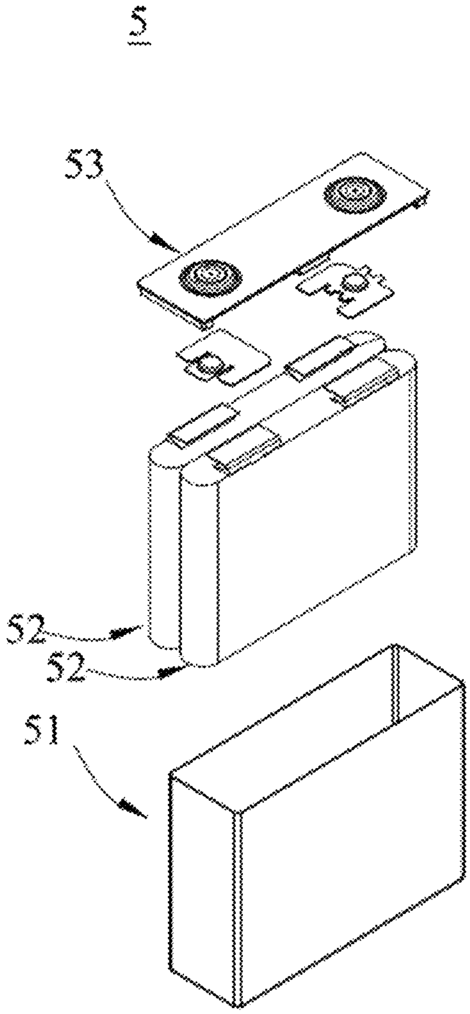
FIG. 6 is an exploded view of the secondary battery according to the embodiment of the present disclosure shown in FIG. 5.

In some embodiments, referring to FIG. 6, the outer package includes a casing 51 and a cover plate 53. The casing 51 includes a bottom plate and a side plate connected to the bottom plate, and the bottom plate and the side plate enclose an accommodating cavity. The casing 51 has an opening in communication with the accommodating cavity, and the cover plate 53 can cover the opening to enclose the accommodating cavity. The positive electrode plate, the negative electrode plate and the isolation film forms an electrode assembly 52 through a winding process or a lamination process. The electrode assembly 52 is enclosed in the accommodating cavity. The electrolyte is immersed in the electrode assembly 52. The secondary battery 5 may include one or more electrode assemblies 52, and those skilled in the art can select according to specific actual requirements.

In some embodiments, the secondary battery may be assembled into a battery module, and the battery module may include one or more secondary batteries, the specific number of which can be selected by those skilled in the art according to the application and a capacity of the battery module.

Figure 7:
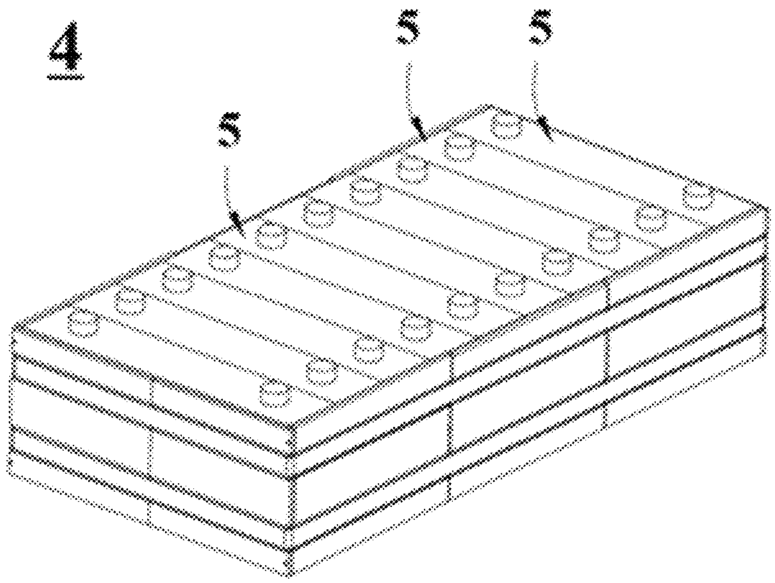
FIG. 7 is a schematic diagram of a battery module according to an embodiment of the present disclosure.

FIG. 7 illustrates a battery module 4 as an example. Referring to FIG. 7, a plurality of secondary batteries 5 of the battery module 4 is sequentially arranged along a length direction of the battery module 4. Alternatively, the secondary batteries may be arranged in any other manner. The plurality of secondary batteries 5 can be further fixed by fasteners.

Alternatively, the battery module 4 may further include a shell having an accommodating space, and the plurality of secondary batteries 5 is accommodated in the accommodating space.

In some embodiments, the above battery modules may be assembled into a battery pack, and the number of the battery modules contained in the battery pack may be one or more, specific number of which can be selected by those skilled in the art according to the application and capacity of the battery pack.

Figure 8:
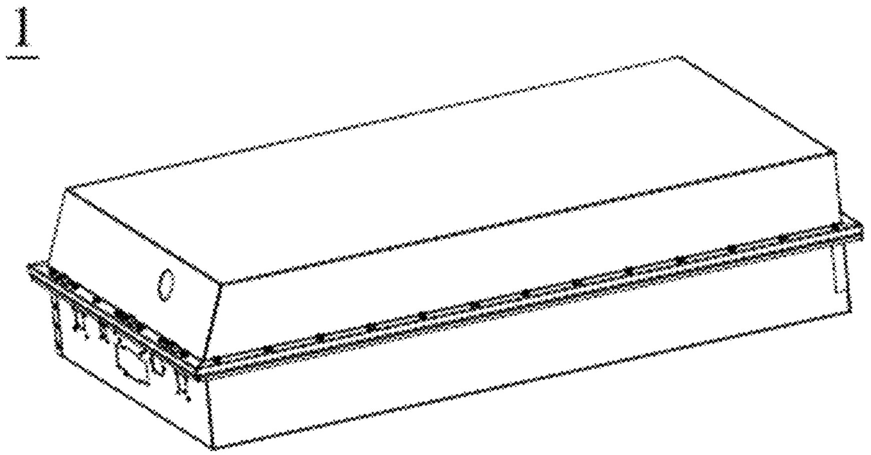
FIG. 8 is a schematic diagram of a battery pack according to an embodiment of the present disclosure.
Figure 9:
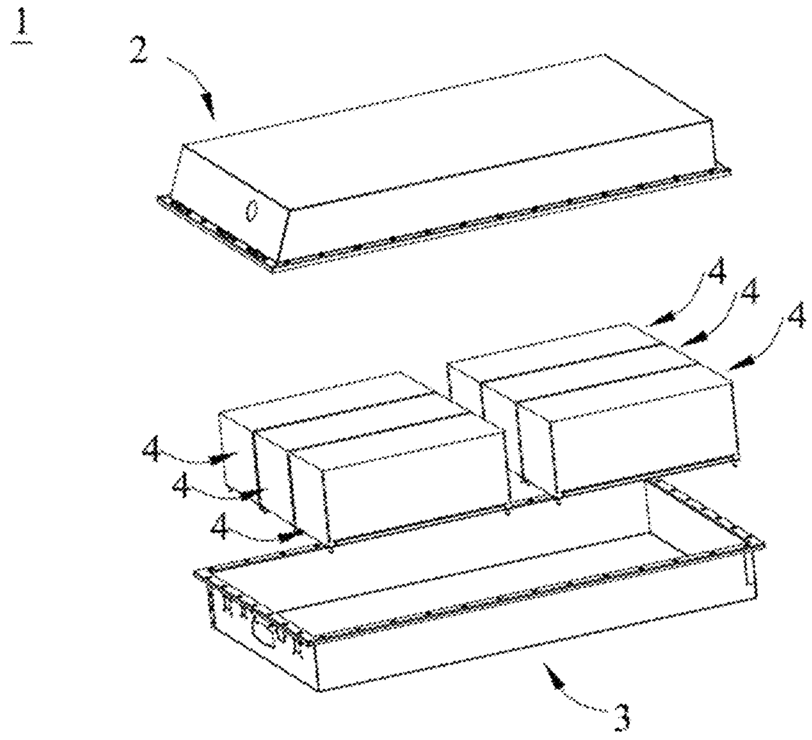
FIG. 9 is an exploded view of the battery pack according to the embodiment of the present disclosure as shown in FIG. 8.

FIG. 8 and FIG. 9 show a battery pack 1 as an example. Referring to FIG. 8 and FIG. 9, the battery pack 1 includes a battery box and a plurality of battery modules 4 provided in the battery box. The battery box includes an upper box body 2 and a lower box body 3, and the upper box body 2 can cover the lower box body 3 to form a closed space for accommodating the battery module 4. The plurality of battery modules 4 may be arranged in the battery box in any manner.

In addition, the present disclosure further provides a powered device, and the powered device includes at least one of the secondary battery, the battery module, or the battery pack according to the present disclosure. The secondary battery, the battery module or the battery pack may be used as a power supply for the powered device, or may be used as an energy storage unit of the powered device. The powered device may include a mobile device (such as a mobile phone and a notebook computer), an electric vehicle (such as a pure electric vehicle, a hybrid electric vehicle, a plug-in hybrid electric vehicle, an electric bicycle, an electric scooter, an electric golf cart, and an electric truck), an electrical train, a ship, a satellite, an energy storage system, and the like, but it is not limited thereto.

The powered device may select the secondary battery, the battery module, or the battery pack according to use requirements thereof.

Figure 10:
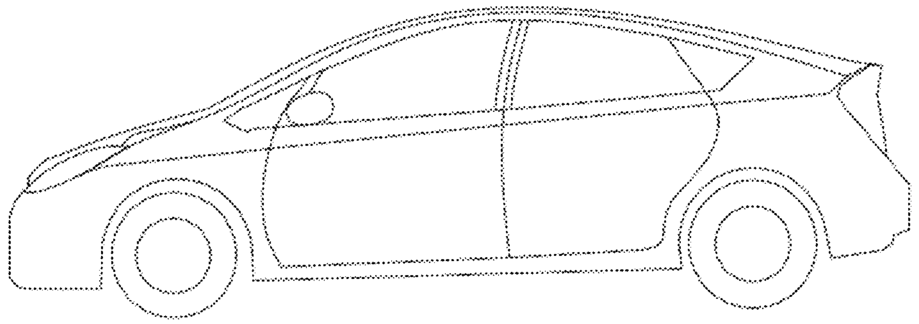
FIG. 10 is a schematic diagram of a powered device in which a secondary battery is used as a power source according to an embodiment of the present disclosure.

FIG. 10 illustrates a powered device as an example. The powered device is a pure electric vehicle, a hybrid electric vehicle, a plug-in hybrid electric vehicle and the like. In order to meet requirements of the powered device for high power and high energy density of the secondary battery, a battery pack or a battery module can be adopted.

Hereinafter, embodiments of the present application will be described. The embodiments described below are exemplary only and should not be construed as limiting the present application. When specific techniques or conditions are not specified in the examples, they are performed according to techniques or conditions described in the literature in the art or according to the product description. The used reagents or instruments without indicating the manufacturer are common products that can be obtained commercially.

The layered metal oxides prepared in the following Embodiments and Comparative examples have a general formula:

$$Na_xZn_aNi_bMn_cM1_dO_2M2_e.$$

In the following Embodiments and Comparative examples, If there is M1 element, the M1 element includes at least one element selected from Cu, Fe, Mg, and Ti.

In the following Embodiments and Comparative examples, If there is M2 element, the M2 element includes at least one element selected from B and F.

The values of x, a, b, c, d and e in each of the Embodiments and the Comparative examples are found in Table 1.

Embodiment 1

A target general formula is $Na_{0.78}Zn_{0.05}Ni_{0.2}Mn_{0.75}O_2F_{0.01}$.

Based on a stoichiometric ratio of the target general formula, 16.873 g of $Na_2CO_3$ (99%), 6.097 g of NiO (98%), 1.66 g of ZnO (98%), 24.17 g of $Mn_2O_3$ and 0.17 g of NaF (98%) are mixed as raw materials in an agate ball milling pot of a planetary ball mill. The raw materials are sufficiently ground at a rotation speed of 400 r/min. Thereafter, the temperature of the raw materials is increased to 850° C. at a heating rate of 3° C./min in a muffle furnace, and the temperature is maintained and the raw materials are calcined for 24 h. After that, the raw materials are naturally cooled to room temperature to obtain a black material of $Na_{0.78}Zn_{0.05}Ni_{0.2}Mn_{0.75}O_2\ F_{0.01}$.

Embodiments 2-16

Embodiments 2 to 16 differ from Embodiment 1 in the target general formula of the layered metal oxide with reference to Table 1.

In Embodiments 9 to 16, M1 element and M2 element were respectively introduced into the product by the following ways. The M1 element includes at least one element selected from Cu, Fe, Mg, and Ti, and the M2 element includes at least one element selected from B and F. The ways for introducing the M1 element and M2 element are as follows:

(1) Cu element is introduced into the product by introducing CuO into the raw materials;

(2) Fe element is introduced into the product by introducing $Fe_2O_3$ into the raw materials;

(3) Mg element is introduced into the product by introducing MgO into the raw materials;

(4) Ti element is introduced into the product by introducing $TiO_2$ into the raw materials;

(5) B element is introduced into the product by introducing $B_2O_3$ into the raw materials; and (6) F element is introduced into the product by introducing NaF into the raw materials.

Comparative Examples 1 to 8

Comparative examples 1 to 8 differ from Embodiment 1 in the target general formula of the layered metal oxide with reference to Table 1.

Preparation of Secondary Battery

The preparation of the positive electrode plate is described below. A positive electrode active material, a conductive agent of carbon black, a binding agent of polyvinylidene fluoride (PVDF) and N-methylpyrrolidone (NMP) were stirred and mixed uniformly in a weight ratio of 80:15:5 to obtain a positive electrode slurry. Thereafter, the positive electrode slurry was uniformly coated on the positive electrode current collector of aluminum foil, dried, cold-pressed, and slitted to obtain a positive electrode plate. The P2-type layered metal oxides prepared in the above Embodiments and Comparative examples were used as positive electrode active materials, respectively.

A negative electrode plate is prepared in a manner that the negative electrode plate is a thin active metal sodium plate with a diameter of 16 mm.

The preparation of an electrolytic solution is described below. In an argon atmosphere glove box ($H_2O$<0.1 ppm, $O_2$<0.1 ppm), an organic solvent of diethyl carbonate (DEC)/ethylene carbonate (EC) was mixed uniformly at a volume ratio of 1:1. An appropriate amount of sodium salt $NaPF_6$ was then added, and the organic solvent and the sodium salt were sufficiently dissolved and uniformly stirred to be prepared as an $NaPF_6$ solution with a concentration of 1 mol/L to obtain the electrolytic solution of Embodiment 1.

Glass fiber was used as the separator.

The battery assembly is described below. In the glove box, foam nickel, a negative electrode Na sheet, the separator, and the positive electrode plate were successively placed into a button cell casing. Thereafter, the electrolytic solution was dropped in the cell casing, and the cell casing was then sealed to obtain a button cell.

Analysis and Detection

1. X-ray Diffraction Analysis

The freshly prepared layered metal oxide was soaked in deionized water for 24 hours to obtain a water-washed layered metal oxide.

The freshly prepared layered metal oxide and the water-washed layered metal oxide were respectively subjected to the X-ray diffraction analysis to obtain an XRD spectrum, and the intensity of the characteristic peak of the (002) crystal plane was collected and calculated by the following equation:

$$I/I_0 \geq 0.8,$$

where $I_0$ is an intensity of the characteristic peak of the (002) crystal plane of the freshly prepared layered metal oxide, which was not soaked in water, and I is an intensity of the characteristic peak of the (002) crystal plane of the layered metal oxide after being soaked in water for 24 hours.

The X-ray diffraction analysis parameters are as follows:
the average particle size of the powder sample is 9 μm;
the radiation source is CuK rays;
the scan mode is step-by-step scanning;
the scan conditions are 0.016358°/step; and
the incident slit is 2.5 mm, the anti-scatter slit is 18 mm, and the receiving slit is 0.30 mm.

2. Scanning Electron Microscopy Analysis

The layered metal oxides before and after water washing of Embodiment 1 were analyzed using a scanning electron microscope.

3. Battery Analysis 3.1 Specific Discharge Capacity Analysis

The 2-4.5 V specific capacity test was described below. The battery was charged to 4.5V with a constant current of 0.1 C at 25° C., stood for 5 min, and discharged to 2 V at 0.1 C. An obtained capacity was recorded as 2-4.5V specific capacity.

The 1.5-4.3V specific capacity test was describe below. The battery was charged to 4.3 V with a constant current of 0.1 C at 25° C., stood for 5 min, and discharged to 1.5 V at 0.1 C. An obtained capacity was recorded as 1.5-4.3V specific capacity.

3.2 Cyclic Specific Capacity Analysis

The battery was charged to 4.5 V with a constant current of 0.1 C at 25° C., stood for 5 min, and discharged to 2 V at 0.1 C. An obtained capacity was recorded as an initial capacity CO. Thereafter the same battery was charged to 4.5 V at a constant current of 1 C, stood for 5 min, and then discharged to 2 V at a constant current of 1 C. An obtained capacity was recorded as an initial capacity C1. After that, the above steps were repeated for the same battery, i.e., the battery was charged and discharged at a constant current of 1 C, and meanwhile the discharge capacity C50 of the battery after the $50^{th}$ constant current charge and discharge cycle at a rate of 1 C was recorded as below:

$$50\text{-week capacity retention}=C50/C1$$

3.3 Discharge Medium Voltage

The battery was charged to 4.5 V with a constant current of 0.1 C at 25° C., stood for 5 min, and then discharged to 2 V at 0.1 C. The resulting discharge medium voltage was recorded as 2-4.5V discharge medium voltage.

3.4 Average Discharge Voltage

The battery was charged to 4.5 V with a constant current of 0.1 C at 25° C., stood for 5 min, and discharged to 2 V at 0.1 C. A ratio of the 2-4.5V specific discharge energy to the 2-4.5V discharge specific capacity was recorded as the average discharge voltage.

Test results for Embodiments and Comparative examples are found in Table 2.

TABLE 1

| | Design Composition | x | a | b | c | d | e | a/c | b/c |
|---|---|---|---|---|---|---|---|---|---|
| Embodiment 1 | $Na_{0.78}Zn_{0.05}Ni_{0.2}Mn_{0.75}O_2F_{0.01}$ | 0.78 | 0.05 | 0.2 | 0.75 | 0 | 0.01 | 0.07 | 0.27 |
| Embodiment 2 | $Na_{0.78}Zn_{0.075}Ni_{0.18}Mn_{0.75}O_2F_{0.01}$ | 0.78 | 0.075 | 0.175 | 0.75 | 0 | 0.01 | 0.10 | 0.23 |

TABLE 1-continued

| | Design Composition | x | a | b | c | d | e | a/c | b/c |
|---|---|---|---|---|---|---|---|---|---|
| Embodiment 3 | $Na_{0.78}Zn_{0.03}Ni_{0.22}Mn_{0.75}O_2F_{0.01}$ | 0.78 | 0.03 | 0.22 | 0.75 | 0 | 0.01 | 0.04 | 0.29 |
| Embodiment 4 | $Na_{0.78}Zn_{0.067}Ni_{0.26}Mn_{0.67}O_2F_{0.01}$ | 0.78 | 0.067 | 0.26 | 0.67 | 0 | 0.01 | 0.10 | 0.39 |
| Embodiment 5 | $Na_{0.78}Zn_{0.03}Ni_{0.32}Mn_{0.67}O_2F_{0.01}$ | 0.78 | 0.03 | 0.32 | 0.67 | 0 | 0.01 | 0.04 | 0.45 |
| Embodiment 6 | $Na_{0.6}Zn_{0.05}Ni_{0.2}Mn_{0.75}O_2F_{0.01}$ | 0.6 | 0.05 | 0.2 | 0.75 | 0 | 0.01 | 0.07 | 0.27 |
| Embodiment 7 | $Na_{0.85}Zn_{0.05}Ni_{0.2}Mn_{0.75}O_2F_{0.01}$ | 0.85 | 0.05 | 0.2 | 0.75 | 0 | 0.01 | 0.07 | 0.27 |
| Embodiment 8 | $Na_{0.78}Zn_{0.05}Ni_{0.2}Mn_{0.75}O_2F_{0.05}$ | 0.78 | 0.05 | 0.2 | 0.75 | 0 | 0.052 | 0.07 | 0.27 |
| Embodiment 9 | $Na_{0.78}Zn_{0.05}Ni_{0.2}Mn_{0.75}Fe_{0.05}O_2$ | 0.78 | 0.05 | 0.2 | 0.75 | 0.05 | 0 | 0.07 | 0.27 |
| Embodiment 10 | $Na_{0.78}Zn_{0.05}Ni_{0.2}Mn_{0.75}Ti_{0.01}O_2$ | 0.78 | 0.05 | 0.2 | 0.75 | 0.01 | 0 | 0.07 | 0.27 |
| Embodiment 11 | $Na_{0.78}Zn_{0.05}Ni_{0.2}Mn_{0.75}Mg_{0.01}O_2$ | 0.78 | 0.05 | 0.2 | 0.75 | 0.01 | 0.01 | 0.07 | 0.27 |
| Embodiment 12 | $Na_{0.78}Zn_{0.05}Ni_{0.2}Mn_{0.75}O_2B_{0.01}$ | 0.78 | 0.05 | 0.2 | 0.75 | 0 | 0.01 | 0.07 | 0.27 |
| Embodiment 13 | $Na_{0.78}Zn_{0.05}Ni_{0.2}Mn_{0.75}O_2$ | 0.78 | 0.05 | 0.2 | 0.75 | 0 | 0 | 0.07 | 0.27 |
| Embodiment 14 | $Na_{0.78}Zn_{0.05}Ni_{0.2}Mn_{0.75}Fe_{0.02}Mg_{0.01}O_2$ | 0.78 | 0.05 | 0.2 | 0.75 | 0.03 | 0 | 0.07 | 0.27 |
| Embodiment 15 | $Na_{0.78}Zn_{0.05}Ni_{0.28}Mn_{0.67}Cu_{0.02}Fe_{0.02}Mg_{0.01}O_2B_{0.01}$ | 0.78 | 0.05 | 0.28 | 0.67 | 0.05 | 0.01 | 0.07 | 0.42 |
| Embodiment 16 | $Na_{0.78}Zn_{0.05}Ni_{0.28}Mn_{0.67}Cu_{0.02}Fe_{0.02}Mg_{0.01}O_2B_{0.01}F_{0.01}$ | 0.78 | 0.05 | 0.28 | 0.67 | 0.05 | 0.02 | 0.07 | 0.42 |
| Comparative example 1 | $Na_{0.78}Ni_{0.25}Mn_{0.75}O_2$ | 0.78 | 0 | 0.33 | 0.67 | 0 | 0 | 0.00 | 0.49 |
| Comparative example 2 | $Na_{0.78}Ni_{0.2}Mn_{0.75}Ca_{0.05}O_2$ | 0.78 | 0 | 0.2 | 0.75 | 0.05 | 0 | 0.00 | 0.27 |
| Comparative example 3 | $Na_{0.78}Ni_{0.2}Mn_{0.75}Fe_{0.05}O_2F_{0.01}$ | 0.78 | 0 | 0.2 | 0.75 | 0.05 | 0.01 | 0.00 | 0.27 |
| Comparative example 4 | $Na_{0.78}Ni_{0.16}Mn_{0.67}Fe_{0.17}Mg_{0.05}O_2B_{0.025}$ | 0.78 | 0 | 0.16 | 0.67 | 0.22 | 0.025 | 0.00 | 0.42 |
| Comparative example 5 | $Na_{0.78}Zn_{0.2}Ni_{0.155}Mn_{0.67}Fe_{0.01}Mg_{0.015}O_2F_{0.01}$ | 0.78 | 0.2 | 0.155 | 0.67 | 0.025 | 0.01 | 0.30 | 0.23 |
| Comparative example 6 | $Na_{0.78}Zn_{0.05}Ni_{0.05}Mn_{0.9}O_2$ | 0.78 | 0.05 | 0.05 | 0.9 | 0 | 0 | 0.06 | 0.06 |
| Comparative example 7 | $Na_{0.78}Zn_{0.05}Ni_{0.45}Mn_{0.5}O_2$ | 0.78 | 0.05 | 0.45 | 0.5 | 0 | 0 | 0.10 | 0.90 |
| Comparative example 8 | $NaZn_{0.067}Ni_{0.263}Mn_{0.67}O_2$ | 1 | 0.067 | 0.263 | 0.67 | 0 | 0 | 0.10 | 0.39 |

TABLE 2

| | Design Composition | Before and after washing $I/I_0$ | Specific capacity mAh/g (1.5-4.3 V) | Specific capacity mAh/g (2-4.5 V) | Discharge medium voltage V (2-4.5 V) | Average discharge voltage V (2-4.5 V) | 50-week capacity Retention % |
|---|---|---|---|---|---|---|---|
| Embodiment 1 | $Na_{0.78}Zn_{0.05}Ni_{0.2}Mn_{0.75}O_2F_{0.01}$ | 0.97 | 167.89 | 127.38 | 3.61 | 3.53 | 98.33% |
| Embodiment 2 | $Na_{0.78}Zn_{0.075}Ni_{0.18}Mn_{0.75}O_2F_{0.01}$ | 1.05 | 159.57 | 119.18 | 3.60 | 3.52 | 98.94% |
| Embodiment 3 | $Na_{0.78}Zn_{0.03}Ni_{0.22}Mn_{0.75}O_2F_{0.01}$ | 0.89 | 171.38 | 131.67 | 3.61 | 3.53 | 98.55% |
| Embodiment 4 | $Na_{0.78}Zn_{0.067}Ni_{0.263}Mn_{0.67}O_2F_{0.01}$ | 0.99 | 176.47 | 129.54 | 3.61 | 3.53 | 97.93% |
| Embodiment 5 | $Na_{0.78}Zn_{0.03}Ni_{0.32}Mn_{0.67}O_2F_{0.01}$ | 0.85 | 178.95 | 138.43 | 3.61 | 3.53 | 95.87% |

TABLE 2-continued

| | Design Composition | Before and after washing $I/I_0$ | Specific capacity mAh/g (1.5-4.3 V) | Specific capacity mAh/g (2-4.5 V) | Discharge medium voltage V (2-4.5 V) | Average discharge voltage V (2-4.5 V) | 50-week capacity Retention % |
|---|---|---|---|---|---|---|---|
| Embodiment 6 | $Na_{0.6}Zn_{0.05}Ni_{0.2}Mn_{0.75}O_2F_{0.01}$ | 0.91 | 158.42 | 122.15 | 3.61 | 3.53 | 99.09% |
| Embodiment 7 | $Na_{0.85}Zn_{0.05}Ni_{0.2}Mn_{0.75}O_2F_{0.01}$ | 0.92 | 169.69 | 131.45 | 3.61 | 3.53 | 98.54% |
| Embodiment 8 | $Na_{0.78}Zn_{0.05}Ni_{0.2}Mn_{0.75}O_2F_{0.052}$ | 0.92 | 160.82 | 129.57 | 3.57 | 3.43 | 98.32% |
| Embodiment 9 | $Na_{0.78}Zn_{0.05}Ni_{0.2}Mn_{0.75}Fe_{0.05}O_2$ | 0.95 | 170.26 | 135.4 | 3.61 | 3.53 | 96.83% |
| Embodiment 10 | $Na_{0.78}Zn_{0.05}Ni_{0.2}Mn_{0.75}Ti_{0.01}O_2$ | 0.92 | 169.57 | 129.1 | 3.62 | 3.54 | 98.91% |
| Embodiment 11 | $Na_{0.78}Zn_{0.05}Ni_{0.2}Mn_{0.75}Mg_{0.01}O_2$ | 0.92 | 168.43 | 125.3 | 3.61 | 3.53 | 99.36% |
| Embodiment 12 | $Na_{0.78}Zn_{0.05}Ni_{0.2}Mn_{0.75}O_2B_{0.01}$ | 0.91 | 166.46 | 124.5 | 3.61 | 3.53 | 98.25% |
| Embodiment 13 | $Na_{0.78}Zn_{0.05}Ni_{0.2}Mn_{0.75}O_2$ | 0.9 | 170.91 | 133.9 | 3.61 | 3.53 | 97.83% |
| Embodiment 14 | $Na_{0.78}Zn_{0.05}Ni_{0.2}Mn_{0.75}Fe_{0.02}Mg_{0.01}O_2$ | 0.92 | 167.45 | 128.57 | 3.61 | 3.53 | 99.25% |
| Embodiment 15 | $Na_{0.78}Zn_{0.05}Ni_{0.28}Mn_{0.67}Cu_{0.02}Fe_{0.02}Mg_{0.01}O_2B_{0.01}$ | 0.95 | 168.34 | 129.91 | / | / | 97.89% |
| Embodiment 16 | $Na_{0.78}Zn_{0.05}Ni_{0.28}Mn_{0.67}Cu_{0.02}Fe_{0.02}Mg_{0.01}O_2B_{0.01}F_{0.01}$ | 0.91 | 165.73 | 130.52 | / | / | 98.76% |
| Comparative example 1 | $Na_{0.78}Ni_{0.25}Mn_{0.75}O_2$ | 0.73 | 161.44 | 125.17 | 3.60 | 3.52 | 65.2% |
| Comparative example 2 | $Na_{0.78}Ni_{0.2}Mn_{0.75}Ca_{0.05}O_2$ | 0.63 | 163.86 | 129.82 | 3.49 | 3.41 | 68.2% |
| Comparative example 3 | $Na_{0.78}Ni_{0.2}Mn_{0.75}Fe_{0.05}O_2F_{0.01}$ | 0.80 | 169.32 | 128.72 | 3.60 | 3.52 | 78.3% |
| Comparative example 4 | $Na_{0.78}Ni_{0.16}Mn_{0.67}Fe_{0.17}Mg_{0.05}O_2B_{0.025}$ | 0.68 | 165.25 | 135.45 | 3.51 | 3.43 | 80.3% |
| Comparative example 5 | $Na_{0.78}Zn_{0.2}Ni_{0.155}Mn_{0.67}Fe_{0.01}Mg_{0.015}O_2F_{0.01}$ | 0.96 | 168.91 | 110.22 | / | / | 75.6% |
| Comparative example 6 | $Na_{0.78}Zn_{0.05}Ni_{0.05}Mn_{0.9}O_2$ | 0.93 | 174.13 | 155.63 | 2.92 | 2.99 | 76.7% |
| Comparative example 7 | $Na_{0.78}Zn_{0.05}Ni_{0.45}Mn_{0.5}O_2$ | 0.95 | 179.45 | 164.59 | 3.31 | 3.30 | 72.59% |
| Comparative example 8 | $NaZn_{0.067}Ni_{0.263}Mn_{0.67}O_2$ | 0.88 | 161.82 | 129.10 | 3.33 | 3.30 | 85.11% |

Results and Discussion

1. Phase Analysis

The layered metal oxide of Embodiment 1 has a ratio (I/I0) of a 002 characteristic peak before being water-washed to a 002 characteristic peak after being water-washed in the range of 0.85 to 1.05. A ratio (I/I0) of a 002 characteristic peak before being water-washed to a 002 characteristic peak after being water-washed of the layered metal oxide of the Comparative example is in the range of 0.63 to 0.96. A ratio (I/I0) of the 002 characteristic peak before being water-washed to a 002 characteristic peak after being water-washed of the layered metal oxide of the Comparative example is in the range of 0.63 to 0.8 as the layered metal oxide only contains Ni and Mn elements without Zn. A ratio of the 002 characteristic peak before being water-washed to a 002 characteristic peak after being water-washed of the layered metal oxide of the Comparative example is equal to or greater than 0.8 as the layered metal oxide contains Zn. Accordingly, Zn is an essential element, and the layered metal oxide with an appropriate ratio of Zn/Ni/Mn of the Embodiments has excellent phase structure stability.

FIG. 1 shows (a), (b), and (c) that illustrate XRD spectrum of the freshly prepared layered metal oxide (Na0.78Zn0.05Ni0.2Mn0.75O2F0.01) of Embodiment 1, the water-washed layered metal oxide (Na0.78Zn0.05Ni0.2Mn0.75O2F0.01), and a PDF card (00-054-0894) for standard P2 phase (Na0.67Ni0.33Mn0.67O2), respectively. As shown in the figure, the characteristic peaks of XRD before and after being water-washed in Embodiment 1 all coincide with characteristic peaks of (002), (004), (100), (101), and (012) in the standard XRD spectrum, which represents single P2 phase. It is noted that two small characteristic peaks (marked with X) of different standard cards may be found around 27.2° and 28.4° in the XRD spectrum of the product of Embodiment 1, and reflect the phase structure characteristics of ordered arrangement of Na and vacancies. In addition, the peak intensities of the XRD characteristic peaks before and after being water-washed hardly changed. For example, the (I/I0) of the 002 peak around 15.8° was 0.97, and the two characteristic peaks around 27.2° and 28.4° did not disappear, indicating that the whole structure of Embodiment 1 has excellent structural stability in water and air.

Figure 2:
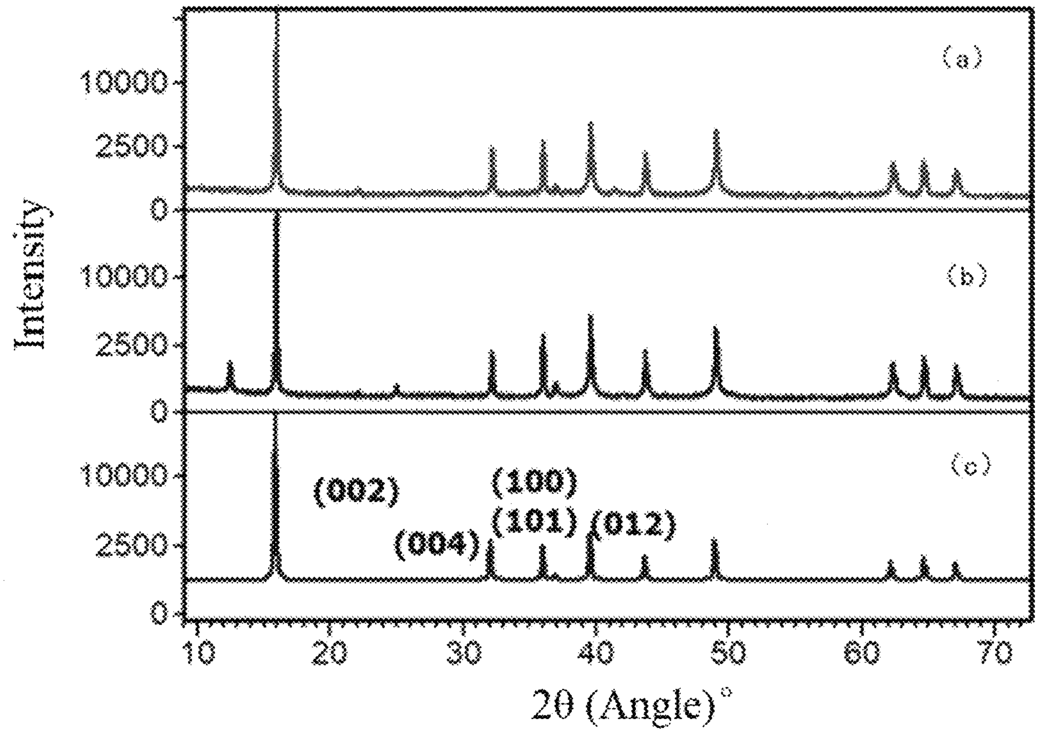
FIG. 2 shows (a), (b), and (c) that respectively illustrate XRD spectrum of a freshly prepared layered metal oxide, a water-washed layered metal oxide, and a standard phase card (00-054-0894) of Comparative Example 1.

FIG. 2 shows (a), (b), and (c) that illustrate XRD spectrum of the freshly prepared layered metal oxide (Na0.78Ni0.25Mn0.75O2), the water-washed layered metal oxide (Na0.78Ni0.25Mn) and a PDF card (00-054-0894) for standard P2 phase (Na0.67Ni0.33Mn0.67O2), respectively.

As shown in the figure, the characteristic peaks of XRD before being water-washed of the Comparative example 1 all coincide with the characteristic peaks of (002), (004), (100), (101), and (012) in the standard XRD spectrum, while the impurity peaks with very low intensity appear around 200 and 400, and the impurity peak around 400 belongs to the impurity peak of NiO. In addition to the characteristic peak of P2 phase and weak impurity peak of NiO before washing, new impurity peaks appeared around 12° and 25° after being water-washed, which did not belong to the characteristic peak of P2 phase. This indicates that side reactions occurred in the partial structure of material after being water-washed and the phase structure was unstable during the washing.

The characteristic peaks of XRD of the freshly prepared layered metal oxide of Embodiment 1 are shown below:

XRD Characteristic Peaks of Layered Metal Oxides of Embodiment 1

| Serial Number | Characteristic Peak 2θ° | Relative Intensity % | Corresponding Crystal Plane |
|---|---|---|---|
| 1 | 15.85 | 100 | (002) |
| 2 | 32.02 | 10.69 | (004) |
| 3 | 35.82 | 12.16 | (100) |
| 4 | 36.77 | 1.05 | (101) |
| 5 | 39.44 | 17.81 | (012) |
| 6 | 27.17 | 0.57 | Na/vacancy ordered superlattice peak |
| 7 | 28.34 | 0.66 | Na/vacancy ordered superlattice peak |

The XRD characteristic peaks of the freshly prepared layered metal oxide of Comparative example 1 are shown below:

XRD Characteristic Peak of the Layered Metal Oxide of Comparative Example 1

| Serial Number | Characteristic Peak 2θ° | Relative Intensity % | Corresponding Crystal Plane |
|---|---|---|---|
| 1 | 15.90 | 100 | (002) |
| 2 | 32.12 | 9.88 | (004) |
| 3 | 35.94 | 13.12 | (100) |
| 4 | 36.87 | 0.36 | (101) |
| 5 | 39.52 | 21.24 | (012) |
| 6 | 22.03 | 0.27 | impurity peak of a byproduct |
| 7 | 41.34 | 1.54 | impurity peak of a byproduct |

2. Topographic Analysis

Figure 3:
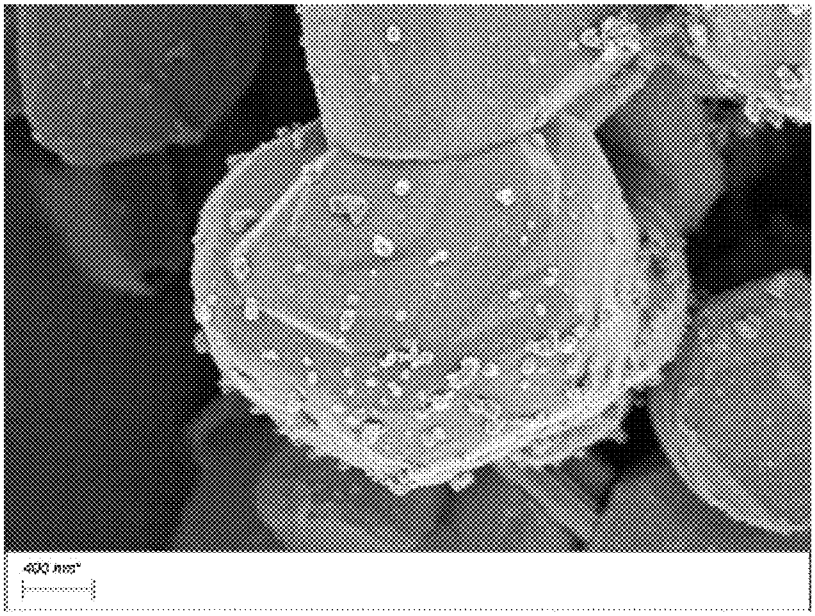
FIG. 3 shows (a) and (b) that illustrate scanning electron micrographs of the layered metal oxide of Embodiment 1 before and after water washing, respectively.
Figure 3:
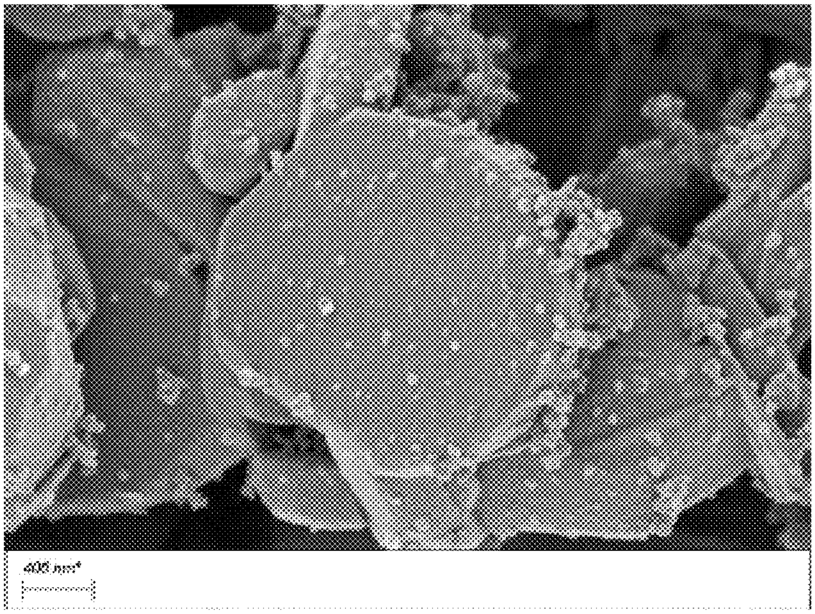

FIG. 3 shows (a) and (b) that illustrate scanning electron micrographs of the layered metal oxide of Embodiment 1 before and after being water-washed, respectively. As shown in the figure, the topography of the layered metal oxide of Embodiment 1 is an irregular hexagonal prism with smooth edge lines irregularly aggregated together, and the average particle size distribution is in a range of 3 μm to 15 μm.

As comparing the photographs of (a) and (b) of FIG. 3 before and after being water-washed, there is no significant change in the surface, shape, and size of the material before and after being water-washed.

3. Battery Performance Analysis

Figure 4:
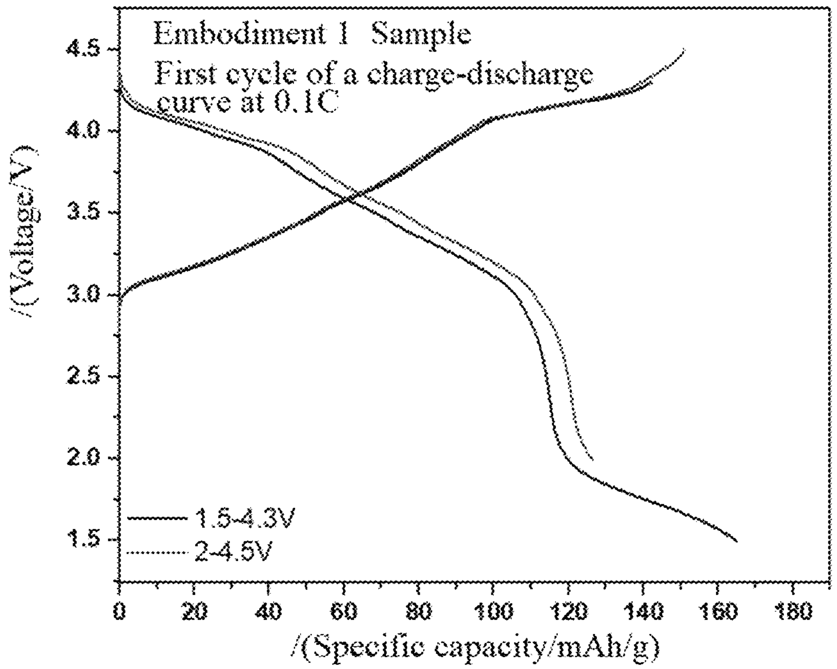
FIG. 4 shows (a) that illustrates a specific discharge capacity curve of the layered metal oxide of Embodiment 1 and (b) that illustrates a specific discharge capacity curve of the layered metal oxide of Comparative example 1.
Figure 4:
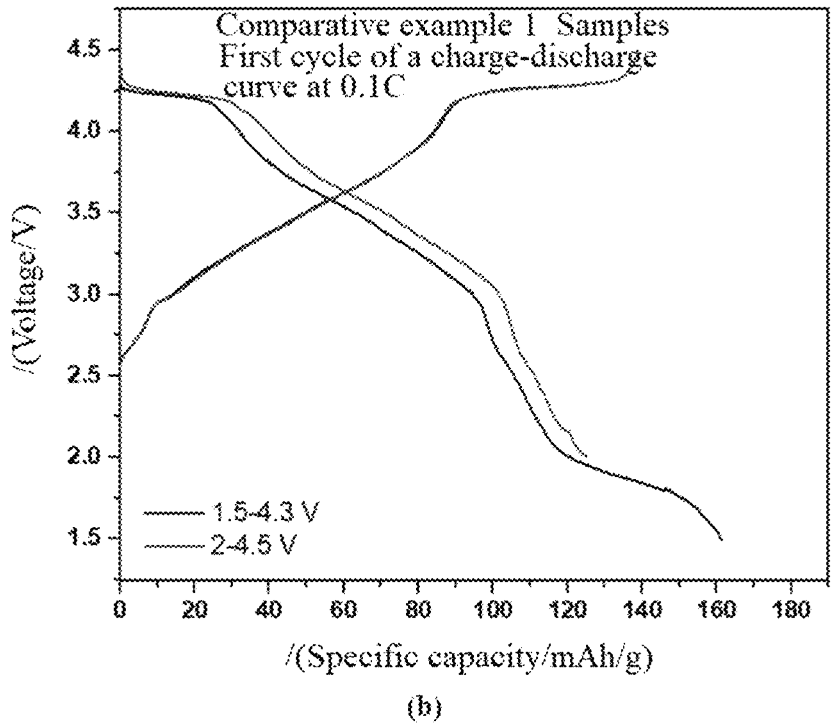

FIG. 4 (*a*) shows a 2-4.5V/1.5-4.3V specific discharge capacity curve of the layered metal oxide of Embodiment 1, and FIG. 4 (*b*) shows a 2-4.5V/1.5-4.3V specific discharge capacity curve of the layered metal oxide of Comparative example 1.

The 2-4.5V/1.5-4.3V specific capacities of the layered metal oxides of Embodiment 1 were 127.3 mAh/g and 167.8 mAh/g, respectively, and the specific capacities of the layered metal oxides of Comparative example 1 were 125.1 mAh/g and 161.4 mAh/g. Although the active variable valent Ni element of Embodiment 1 is less, the layered metal oxide shows the relatively high capacity in two voltage ranges than the Comparative example containing more heterogeneous phase.

The cycle retention of the layered metal oxide of Embodiment 1 was 98.3%@50 cycles, and the cycle retention of the layered metal oxide of Comparative example 1 was 65.2%@50 cycles. The layered metal oxide of Embodiment 1 shows a higher cycle retention than that of Comparative example 1, which has very excellent cycle performance.

The average discharge medium voltage of the layered metal oxide of Embodiment 1 was 3.61 V, and the average discharge voltage thereof is 3.53 V. The average discharge medium voltage of the layered metal oxide of Comparative example 1 containing impurity phase was 3.60 V, and the average discharge voltage thereof is 3.52 V. The layered metal oxide of Embodiment 1 exhibits a higher average discharge voltage.

In Embodiments 1 to 8, the values of the a/c of the layered metal oxides are in the range of 0.04 to 0.10, and the values of the b/c are in the range of 0.23 to 0.45. The elements of Zn, Ni and Mn have a synergistic effect, which effectively improves the phase structure stability of the layered metal oxide, and the battery exhibits improved specific capacity, discharge medium voltage, average discharge voltage, and/or capacity retention.

In Embodiments 9 to 16, doping elements Fe, Cu, Mg, Ti, B or F are added, and these elements have a synergistic effect with Zn, Ni, and Mn elements to further improve the phase structure stability of the layered metal oxide, and the battery exhibits improved specific capacity, discharge medium voltage, average discharge voltage and/or capacity retention.

In Comparative examples 1 to 4, the values of a/c of the layered metal oxide were 0.00, and the battery did not exhibit improved specific capacity, discharge medium voltage, average discharge voltage, and/or capacity retention.

In Comparative examples 6-7, the values of b/c of the layered metal oxide were 0.06 and 0.90 that is out of the range of 0.23 to 0.45, and the battery did not exhibit improved specific capacity, discharge medium voltage, average discharge voltage, and/or capacity retention.

In Comparative example 8, a value of x of the layered metal oxide was 1 that is out of the range of 0.6 to 0.85, and the battery did not exhibit improved specific capacity, discharge medium voltage, average discharge voltage, and/or capacity retention.

In summary, the content/ratio of each element in the present disclosure is adjusted to be $0.6 \le x \le 0.85$, $0.95 \le a+b+c+d \le 1.05$, $0 \le d \le 0.05$, $0 \le e \le 0.067x$, $0.04 \le a/c \le 0.1$, and $0.23 \le b/c \le 0.45$ by optimizing the composition of the layered metal oxide $Na_xZn_aNi_bMn_cM1_dO_2M2_e$, such that a good synergistic relationship is formed between the elements. The phase structure stability of the layered metal oxide $Na_xZn_aNi_bMn_cM1_dO_2M2_e$, which is used as a positive electrode material for a sodium-ion battery, is surprisingly improved. The battery exhibits increased specific capacity, discharge medium voltage, average discharge voltage and/or capacity retention.

It should be noted that the present disclosure is not limited to the above-mentioned embodiments. The above-mentioned embodiments are merely examples and fall within the scope of the technical solution of the present disclosure, and embodiments having substantially the same constitution as the technical idea and exerting the same function and effect are all included within the technical scope of the present disclosure. In addition, various modifications may be made to the embodiments by those skilled in the art without departing from the spirit of the present disclosure, and other embodiments that are constructed by combining some of the constituent elements of the embodiments are also included in the scope of the present disclosure.

What is claimed is:

1. An electrode active material, comprising a layered metal oxide, the layered metal oxide satisfying a general formula $Na_xZn_aNi_bMn_cM1_dO_2M2_e$, wherein:

$0.6 \leq x \leq 0.85$, $0.95 \leq a+b+c+d \leq 1.05$, $0 < d \leq 0.05$, and $0 \leq e \leq 0.067x$;

$0.04 \leq a/c \leq 0.1$, and $0.23 \leq b/c \leq 0.45$;

M1 is selected from at least one of Li, K, Mg, V, Cr, Ti, and Sc; and

M2 is selected from non-metallic elements other than O.

2. The electrode active material according to claim 1, wherein the electrode active material has at least one of the following characteristics:

$0.03 \leq a \leq 0.075$;

$0.18 \leq b \leq 0.28$;

$0.67 \leq c \leq 0.75$;

$0.03 \leq d \leq 0.05$;

$0 \leq e \leq 0.05$.

3. The electrode active material according to claim 1, wherein the layered metal oxide belongs to a P2 phase hexagonal crystal system P63/mmc space group.

4. The electrode active material according to claim 1, wherein a powder XRD diffraction pattern of the layered metal oxide has at least one of the following characteristic peaks:

a first characteristic peak having a 2θ value in a range of 15.75° to 15.90°;

a second characteristic peak having a 2θ value in a range of 31.95° to 32.10°;

a third characteristic peak having a 2θ value in a range of 35.80° to 35.95°;

a fourth characteristic peak having a 2θ value in a range of 36.75° to 36.90°; or a fifth characteristic peak having a 2θ value in a range of 39.40° to 39.55°.

5. The electrode active material according to claim 4, wherein the electrode active material has at least one of the following characteristics:

a ratio of a diffraction intensity of the second characteristic peak to a diffraction intensity of the first characteristic peak is in a range of 9.5% to 13.5%;

a ratio of a diffraction intensity of the third characteristic peak to the diffraction intensity of the first characteristic peak is in a range of 10.5% to 14.5%;

a ratio of a diffraction intensity of the fourth characteristic peak to the diffraction intensity of the first characteristic peak is in a range of 0.5% to 1.5%; or a ratio of a diffraction intensity of the fifth characteristic peak to the diffraction intensity of the first characteristic peak is in a range of 16.5% to 21.5%.

6. The electrode active material according to claim 4, wherein the electrode active material has at least one of the following characteristics:

the first characteristic peak corresponds to a (002) crystal plane;

the second characteristic peak corresponds to a (004) crystal plane;

the third characteristic peak corresponds to a (100) crystal plane;

the fourth characteristic peak corresponds to a (101) crystal plane; or the fifth characteristic peak corresponds to a (012) crystal plane.

7. The electrode active material according to claim 4, wherein the powder XRD diffraction pattern of the layered metal oxide further has the following characteristic peaks:

a sixth characteristic peak having a 2θ value in a range of 27.15° to 27.25°; and a seventh characteristic peak having a 2θ value in a range of 28.35° to 28.45°.

8. The electrode active material according to claim 7, wherein the electrode active material has at least one of the following characteristics:

a ratio of a diffraction intensity of the sixth characteristic peak to a diffraction intensity of the seventh characteristic peak is 0.3-0.9:1;

a ratio of the diffraction intensity of the sixth characteristic peak to a diffraction intensity of the first characteristic peak is in a range of 0.2% to 1.2%; or a ratio of a diffraction intensity of the seventh characteristic peak to the diffraction intensity of the first characteristic peak is in a range of 0.3% to 1.3%.

9. The electrode active material according to claim 4, wherein measurement conditions of the powder XRD diffraction pattern comprise at least one of the following characteristics:

a volume average particle size of a powder sample is in a range of 5 μm to 15 μm;

a radiation source is CuK rays;

a scanning mode is step-by-step scanning;

scanning conditions are 0.01° to 0.05°/step; or an incident slit is in a range of 2 mm to 3 mm, an anti-scatter slit is in a range of 15 mm to 20 mm, and a receiving slit is in a range of 0.2 mm to 0.4 mm.

10. The electrode active material according to claim 1, wherein

M2 belongs to Period 2, Period 3, or Period 4 of the Periodic Table.

11. The electrode active material according to claim 1, wherein

M2 is selected from at least one of F, CI, B, C, and N.

12. The electrode active material according to claim 1, wherein a powder XRD diffraction pattern of the layered metal oxide has an intensity of a characteristic peak of a (002) crystal plane, which satisfies the following relationship:

$I/I_0 \geq 0.8$, wherein $I_0$ is an intensity of the characteristic peak of the (002) crystal plane of the layered metal oxide without being soaked in water, and I is an intensity of the characteristic peak of the (002) crystal plane of the layered metal oxide after being soaked in water for 24 hours.

13. A secondary battery, comprising a positive electrode, the positive electrode comprising the electrode active material according to claim 1.

14. A powered device, comprising the secondary battery according to claim 13.

15. The electrode active material according to claim 1, wherein, in $Na_xZn_aNi_bMn_cM1_dO_2M2_e$, M1 is one or more selected from K and Sc.

16. The electrode active material according to claim 1, wherein, in $Na_xZn_aNi_bMn_cM1_dO_2M2_e$, M1 is one or more selected from V and Cr.

17. The electrode active material according to claim 1, wherein, in $Na_xZn_aNi_bMn_cM1_dO_2M2_e$, $0<d\leq 0.03$.

18. The electrode active material according to claim 1, wherein $0.03<a\leq 0.075$;

$0.18<b\leq 0.28$;

$0.67<c\leq 0.75$;

$0.03<d\leq 0.05$; and $0\leq e\leq 0.05$.

19. An electrode active material, comprising a layered metal oxide, the layered metal oxide satisfying a general formula $Na_xZn_aNi_bMn_cM1_dO_2M2_e$, wherein:

$0.6\leq x\leq 0.85$, $0.95\leq a+b+c+d\leq 1.05$, $0\leq d\leq 0.05$, and $0<e\leq 0.067x$;

$0.04\leq a/c\leq 0.1$, and $0.23\leq b/c\leq 0.45$;

M1 is selected from at least one of Li, K, Mg, V, Cr, Ti, and Sc; and

M2 is one or more selected from F, Cl, B, C, and N.

20. The electrode active material according to claim 19, wherein M2 comprises F and B.

* * * * *